(12) United States Patent
Kuemmel et al.

(10) Patent No.: US 10,982,762 B2
(45) Date of Patent: Apr. 20, 2021

(54) HYDROSTATIC TRANSMISSION AND METHOD FOR BRAKING USING THE SAME

(71) Applicant: Robert Bosch GmbH, Stuttgart (DE)

(72) Inventors: Bernhard Kuemmel, Neu-Ulm (DE); Martin Behm, Ulm (DE); Michael Mast, Schemmerhofen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/674,578

(22) Filed: Nov. 5, 2019

(65) Prior Publication Data

US 2020/0063862 A1 Feb. 27, 2020

Related U.S. Application Data

(63) Continuation of application No. 15/895,177, filed on Feb. 13, 2018, now Pat. No. 10,550,934.

(30) Foreign Application Priority Data

Feb. 14, 2017 (DE) ...................... 10 2017 202 272.8
May 5, 2017 (DE) ...................... 10 2017 207 569.4

(51) Int. Cl.
*F16H 61/4157* (2010.01)
*F16H 61/465* (2010.01)
(Continued)

(52) U.S. Cl.
CPC ......... *F16H 61/4157* (2013.01); *F16H 39/10* (2013.01); *F16H 61/4017* (2013.01);
(Continued)

(58) Field of Classification Search
CPC ... F16H 61/4017; F16H 61/4157; F16H 61/42
See application file for complete search history.

(56) References Cited

U.S. PATENT DOCUMENTS 3,775,981 A * 12/1973 Molly ................... F01B 3/0035
                                                              60/490
3,884,039 A *  5/1975 Pourian ................ F04B 49/002
                                                              60/445

(Continued)

FOREIGN PATENT DOCUMENTS

DE  10 2014 211 393 A1  12/2014
DE  10 2014 211 394 A1  12/2014
EP        1 960 699 B1   5/2011

*Primary Examiner* — Abiy Teka
*Assistant Examiner* — Matthew Wiblin
(74) *Attorney, Agent, or Firm* — Maginot, Moore & Beck LLP

(57) ABSTRACT

A hydrostatic transmission implements a braking system, in which at least one adjustable traction motor acting as a pump is supported via a closed circuit on an adjustable axial piston machine acting as a motor, which in turn is supported on an internal combustion engine. Since the internal combustion engine should not be rotated at excessive revolution rates, a control unit adjusts the swivel angle of the axial piston machine during braking. The axial piston machine is load-sensitive, as a relationship between the control pressure and the revolution rate and the pivot angle of the machine consists of a pressure difference between the two working lines of the closed circuit. Using a pre-control, a swivel angle of the axial piston machine is set during braking, and the swivel angle is corrected by a revolution rate controller, such that a target revolution rate is obtained on the combustion engine.

14 Claims, 4 Drawing Sheets

(51) Int. Cl.
  *F16H 39/10*   (2006.01)
  *F16H 61/4017*  (2010.01)
  *F16H 61/433*   (2010.01)
  *F16H 61/47*   (2010.01)
  F16H 59/44   (2006.01)
  F16H 59/36   (2006.01)

(52) U.S. Cl.
  CPC ......... *F16H 61/433* (2013.01); *F16H 61/465* (2013.01); *F16H 61/47* (2013.01); F16H 59/44 (2013.01); F16H 2059/366 (2013.01)

(56) References Cited

U.S. PATENT DOCUMENTS

| | | | | |
|---|---|---|---|---|
| 4,364,230 | A * | 12/1982 | Holmes | F16H 61/4157 417/217 |
| 4,382,360 | A * | 5/1983 | Dummer | F16H 61/40 60/444 |
| 4,400,939 | A * | 8/1983 | Moranduzzo | F16H 61/42 60/431 |
| 5,335,750 | A * | 8/1994 | Geringer | B60K 17/10 180/307 |
| 6,338,247 | B1 * | 1/2002 | Drin | B60T 1/093 60/466 |
| 2007/0119163 | A1 * | 5/2007 | Tatsuno | B60W 30/18072 60/493 |
| 2014/0372000 | A1 * | 12/2014 | Rozycki | F16H 61/421 701/58 |
| 2015/0219213 | A1 * | 8/2015 | Neumann | F16H 61/20 701/50 |
| 2016/0312888 | A1 * | 10/2016 | Schmuttermair | F16H 61/42 |
| 2017/0198812 | A1 * | 7/2017 | Girard | B60K 23/00 |

* cited by examiner

HYDROSTATIC TRANSMISSION AND METHOD FOR BRAKING USING THE SAME

This application is a continuation of U.S. application Ser. No. 15/895,177, filed on Feb. 13, 2018, which claims priority under 35 U.S.C. § 119 to patent application no. DE 10 2017 202 272.8, filed on Feb. 14, 2017 in Germany and to patent application no. DE 10 2017 207 569.4, filed on May 5, 2017, the disclosures of which are incorporated herein by reference in their entirety.

The disclosure relates to a hydrostatic transmission, with which hydrostatic braking is possible, and a method for braking with such a hydrostatic transmission.

BACKGROUND

From the prior art, hydrostatic transmissions are known for mobile working machines in which a hydrostatic pump (primary unit) and a hydrostatic motor (secondary unit) are fluidly connected to each other via a closed circuit. An internal combustion engine, for example a diesel engine of the mobile working machine, is coupled to the primary unit and an output, for example an axle or a wheel of the mobile working machine, is coupled to the secondary unit. This means that the mobile working machine has a traction drive that comprises a hydrostatic transmission.

In document EP 1 960 699 B 1, such a hydrostatic transmission is disclosed, which can also be used for braking. The power flows in the opposite direction to the traction drive from the output via the secondary unit acting as a pump and via the primary unit acting as a motor to the internal combustion engine, which is then driven in a passive overrun mode. The working line of the closed circuit, which is under high pressure, is protected by a pressure limiting valve, by means of which a part of the braking power can also be reduced during braking.

The problem with such braking is that the internal combustion engine can only be driven at a maximum revolution rate in order not to be destroyed. Therefore, the primary unit, which is formed as an adjustable axial piston machine and which works as a motor, is placed at a swivel angle during braking at which a torque is generated that can still support the internal combustion engine without it being rotated too rapidly. This is done taking into account the pressure in the working line determined by the setting of the pressure limiting valve.

The disadvantage of the hydrostatic transmissions of the prior art is that the internal combustion engine is not brought to its maximum revolution rate in the braking function. Therefore, a significant part of the braking power must be reduced disadvantageously by means of the pressure limiting valve of the relevant high-pressure line.

Documents DE 10 2014 211 393 A1 and DE 10 2014 211 394 A1 also reveal a hydrostatic transmission that can also be used for braking, wherein the internal combustion engine is to be protected against rotating too rapidly. In the case of these documents, a first part of the braking power is also delivered to the internal combustion engine by the primary unit, while a second part of the braking power is converted into heat via the pressure limiting valve of the relevant high-pressure line. At first, a revolution rate of the internal combustion engine slightly above the permissible revolution rate limit is accepted. In the context of the pre-control of the swivel angle, a swivel angle that is generally higher than the ideal is disclosed. This does not support the maximum possible braking power by the internal combustion engine.

Furthermore, the respective primary units of the aforementioned prior art have mechanically regulated swivel angles. For this, they need mechanical feedback of the current swivel angle.

On the other hand, it is the object of the disclosure to create a hydrostatic transmission and a method in which the cost of the primary unit in terms of technical equipment is reduced.

SUMMARY

The claimed hydrostatic transmission is provided for a traction drive that comprises an internal combustion engine, for example a diesel engine and an output, for example one or more wheels or one or more axles. The hydrostatic transmission comprises on the one hand a rotor—in particular a drive shaft—of a primary unit that can be coupled to the internal combustion engine of the traction drive, which operates as a pump in traction mode, and on the other hand a rotor—in particular a drive shaft—of a secondary unit or several such hydraulically parallel secondary units that can be coupled to the output of the traction and that operate as motor(s) in traction mode. The two units are fluidly connected to each other via two working lines of a closed circuit. The primary unit is an axial piston machine with adjustable swivel angle. The hydrostatic transmission further comprises an electrical control unit by means of which braking can be controlled or adjusted, during which a braking torque of the secondary unit acting as a pump is supported by the primary unit acting as a motor at the rotor. According to the disclosure, forces act on the primary unit with adjustable stroke volume that depend mainly on a pressure difference between the two working lines, but also on a revolution rate of the rotor, and that on increasing with unchanged control of the primary unit lead to a reduction of the swivel angle in pump mode and to an increase in the swivel angle of the primary unit in motor mode.

Thus, the primary unit has load-sensitive behavior. This means that, with a certain control of the pump, the swivel angle thereof depends on the differential pressure between the two working lines of the closed hydraulic circuit and the revolution rate of the pump. In pump mode the powertrain forces act together with a spring arrangement on the control piston or on the inclined disc in opposition to an adjustment towards larger stroke volumes. Such adjustments are, for example, an EV adjustment or an ET adjustment.

In an EV adjustment, a control pressure is controlled by means of a pressure control valve that is adjustable by an electroproportional magnet and is fed to one or the other control chamber of the control cylinder of the primary unit via a directional valve. The stroke volume of the primary unit, which is set at a certain control pressure, is influenced both by the revolution rate of the primary unit and by the pressure difference between the two working lines.

Two pressure control valves are available for ET control. The control pressure in one control chamber of the control cylinder is adjusted with one pressure control valve and the control pressure in the other control chamber is adjusted with the other pressure control valve.

Further according to the disclosure, the hydrostatic transmission comprises a revolution rate controller, the output variable of which is a correction control pressure, which can be added by the control unit to a pre-controlled control pressure of a braking power-dependent pre-control. The sum thus formed from the control pressures acts towards reducing the swivel angle of the primary unit during braking. The target swivel angle of the primary unit is largely achieved by means of the pre-control. The revolution rate controller takes into account and regulates the manufacturing inaccuracies and wear phenomena of the primary unit and different temperatures of the pressure medium. Since no feedback of the current swivel angle and no position control of the primary unit are necessary, the hydrostatic transmission that can be braked is simplified in terms of equipment technology.

With regard to the entire traction drive, the braking torque of the output is thus supported by the two units on the internal combustion engine.

With regard to the hydrostatic transmission according to the disclosure, which does not contain the internal combustion engine, the actual revolution rate of the internal combustion engine that is to be limited may be sensed by a revolution rate sensor arranged on the crankshaft and which thus also does not belong to the hydrostatic transmission according to the disclosure, and can be transmitted to the control unit via a signal input thereof. Alternatively, the actual revolution rate to be limited can be tapped directly at the rotor of the primary unit by a revolution rate sensor belonging to the transmission according to the disclosure, if the crankshaft and the rotor are in one piece. With this arrangement of the revolution rate sensor, the actual revolution rate to be limited can also be determined mathematically by the primary unit from a revolution rate of the rotor determined by the revolution rate sensor, if there is a mechanical gear stage between the crankshaft and the rotor. Preferably, the at least one secondary unit also comprises a revolution rate sensor.

Preferably, the revolution rate controller has as an input variable a revolution rate difference between the actual revolution rate of the internal combustion engine or a variable derived therefrom on the one hand, in particular the actual revolution rate of the primary unit, and on the other hand a set revolution rate of the internal combustion engine or a corresponding variable derived therefrom, in particular a target revolution rate of the primary unit. By using the derived quantities, the hydrostatic transmission according to the disclosure can be manufactured, tested and operated without an electrical or mechanical connection to the internal combustion engine.

Preferably, the revolution rate controller is a P, PI or PID controller. Thus, a fast and accurate approximation of the actual revolution rate to the target revolution rate of the internal combustion engine is achieved. Preferably, the control unit comprises the revolution rate controller.

In particularly effective braking of the hydrostatic transmission according to the disclosure, the target revolution rate is a maximum revolution rate, which can be supported by the internal combustion engine without the engine being rotated at an excessive revolution rate.

The pre-controlled control pressure is a sum of a constant base control pressure and a proportional control pressure in a particularly preferred development.

The proportional control pressure is preferably the product of a power factor and a conveying volumetric flow of the secondary unit. In this case, the power factor takes into account that the swivel forces on the swivel cradle increase as the braking power increases. Here, the dependence on the differential pressure of the two working lines and larger pressure pulsations can also be taken into account. The conveying volumetric flow of the secondary unit is almost linearly proportional to the braking power and is therefore suitable to be taken into account. Therefore, a pressure sensor can be dispensed with, which increases the robustness of the hydrostatic transmission according to the disclosure.

The swivel angle of the primary unit is brought to the optimum value particularly rapidly and safely without the internal combustion engine rotating at an excessive revolution rate if a final control pressure acting towards reducing the swivel angle during braking is a sum of the controlled control pressure and the correction control pressure.

All these control pressures act during braking towards reducing the swivel angle of the primary unit operated as a motor.

The final control pressure preferably acts via an electric control pressure valve and a control cylinder of an adjustment device.

The forces that depend on a pressure difference between the two working lines and the revolution rate of the rotor and the swivel angle can act on an inclined disc or on a control piston of the control cylinder.

In a preferred development of the hydrostatic transmission according to the disclosure, the swivel angle and thus the stroke volume of the primary unit are adjustable on both sides of a zero position. This allows the relevant drive to be used in both directions of travel of the vehicle in traction mode given a constant direction of rotation of the internal combustion engine and accordingly to be braked in both directions according to the disclosure.

In order to ensure that the control pressure can act towards reducing the swivel angle during braking and in the overrun mode and towards increasing the pivot angle in traction mode, two mutually oppositely acting control pressure chambers on the adjustment device of the primary unit are preferred, which can be subjected to the respective control pressure via the common or a respective electrically adjustable control pressure valve. The two control pressure chambers may be provided in a double-acting control cylinder or in two separate control cylinders acting against each other on the inclined disc. Thus, the relevant traction drive can be used in both directions of travel of the vehicle in traction mode with a constant direction of rotation of the internal combustion engine and can be braked accordingly in both directions according to the disclosure.

In this case, a spring arrangement is preferably provided, which acts towards a middle position of the inclined disc, in which the swivel angle and the stroke volume of the primary unit are about zero.

In order to enable high-power braking, it is preferred if a pressure limiting valve is arranged on each of the two working lines. A first part of the braking power can be reduced via the pressure limiting valve concerned, while a second part of the braking power can be reduced via the primary unit and further by the internal combustion engine. The achievable braking power is particularly high if the first part is larger than the second part.

If the volumetric flow over the primary unit increases during high-power braking, the volumetric flow decreases via the pressure limiting valve involved. This can reduce the pressure in the working line that is under high pressure. In order to minimize this pressure reduction or to keep the pressure approximately constant, pressure limiting valves are preferred, which have a flat characteristic curve in terms of the pressure difference thereof as a function of the transmitted volumetric flow thereof.

If on the other hand the hydrostatic transmission according to the disclosure comprises pressure limiting valves with increasing characteristics, in particular the aforementioned proportional control pressure is preferred, which is the product of the power factor and the conveying volumetric flow of the secondary unit and which forms part of the pre-controlled pressure. The power factor then takes into account that the forces towards increasing the swivel angle increase as the braking power increases.

The conveying volumetric flow of the secondary unit can be used for the determination of the braking power, since the flow is essentially proportional to the braking power. Instead of the conveying volumetric flow of the secondary unit, the braking torque or the volumetric flow portion that is discharged via the pressure limiting valve can also be used, since all said variables can be converted to each other based on the target swivel angles as well as the revolution rates of the units.

In order to be able to use the hydrostatic transmission according to the disclosure in different cases, in which the internal combustion engine according to the prior art could rotate too rapidly, the control unit may be developed such that braking can be initiated either by means of a control element, for example the brake pedal, in particular by means of an input for a signal line of the control element, or on the basis of automatic monitoring of the vehicle's actual revolution rate, in particular by means of an input for a speedometer signal, or on the basis of automatic monitoring of the actual revolution rate of the internal combustion engine or the variable derived therefrom.

Preferably, the at least one secondary unit is also implemented with an adjustable swivel angle and thus stroke volume. This can be adjusted, for example, depending on the control element.

This allows the braking torque to be controlled during braking. The control can be electroproportional.

The adjustment device may be an electrically controlled adjustment device (EV or ET) in which a certain control pressure is adjusted according to the force of a proportional magnet.

The method according to the disclosure for braking a hydrostatic transmission has the steps:
Pre-controlling the pre-controlled control pressure of the primary unit,
Calculating the correction control pressure depending on a revolution rate difference between the actual revolution rate of the internal combustion engine or the variable derived therefrom and the target revolution rate of the internal combustion engine or the variable derived therefrom, and
Adding the pre-controlled control pressure with the correction control pressure to the final control pressure.

Feedback of the current swivel angle is therefore not necessary.

With a preferred development of the method according to the disclosure, a prior initiation of the braking is carried out by the driver's request or due to exceeding the revolution rate of the internal combustion engine (actual revolution rate exceeds a desired or a maximum permissible revolution rate) or due to exceeding a driving speed (driving speed exceeds a desired or a maximum permissible driving speed).

Preferably, the braking torque is controlled during braking by pivoting the secondary unit. This can be done depending on the position of the control element, in particular the brake pedal.

The following advantages of high-power braking according to the disclosure can also be of benefit if a cheaper primary unit without position control is used:
maximum utilization of the braking capacity of the closed circuit,
Protection of the diesel engine from excessive revolution rates,
Controllable braking effect,
Almost wear-free (purely hydrostatic) braking, and
The mechanical braking system may be reduced in size by using a combination braking system.

While the high-power braking can only be used for hydrostatic drives with position-controlled pumps to date, which are mainly to be found in agricultural machines, the use of the load-sensitive primary unit according to the disclosure allows the function to also be used in the construction machinery field.

One exemplary embodiment of the hydrostatic transmission according to the disclosure is shown in the drawings. The disclosure is now explained in more detail on the basis of the figures of these drawings.

BRIEF DESCRIPTION OF THE DRAWINGS

In the figures

DETAILED DESCRIPTION

Figure 1:
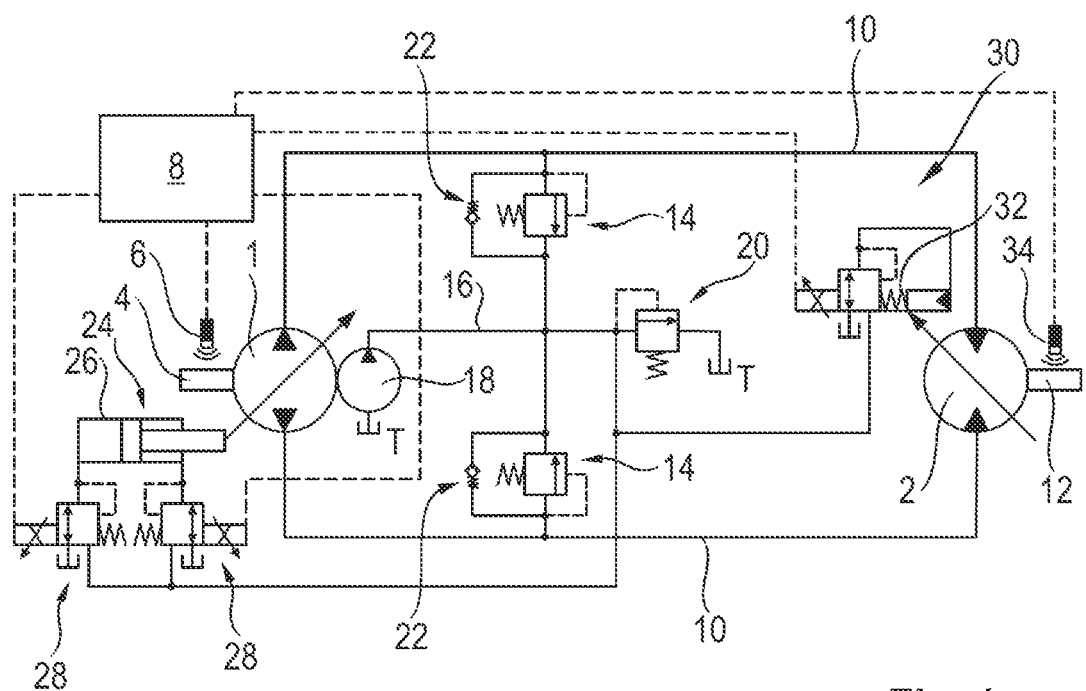
FIG. 1 shows a schematic view of the hydrostatic transmission according to the disclosure according to the exemplary embodiment.

FIG. 1 shows a circuit diagram of the hydrostatic transmission according to the disclosure. It comprises a primary unit 1 and a secondary unit 2, both with an adjustable stroke volume Vg_pump, Vg_mot. The primary unit 1 is an axial piston machine with the drive shaft 4 thereof rotationally fixedly coupled to a crankshaft of a diesel engine (not shown). The revolution rate of the drive shaft 4 is monitored by a revolution rate sensor 6 and an electric control unit 8. In this way the revolution rate of the crankshaft of the diesel engine is also monitored indirectly.

The primary unit 1 is fluidly connected to the secondary unit 2 via a closed hydraulic circuit having two working lines 10. An output (not shown) is rotationally fixedly coupled to a drive shaft 12 of the secondary unit 2. The output is, for example, a differential transmission of a driven axle of a mobile construction machine that is operating in loading mode.

Together with the diesel engine and the output, the hydrostatic transmission according to the disclosure in accordance with FIG. 1 thus forms a traction drive of a mobile construction machine. In a traction mode, the drive shaft 4 of the primary unit 1 serves as a drive shaft and the primary unit 1 works as a pump, while the secondary unit 2 works as a motor and the drive shaft 12 thereof is an output shaft.

In a braking mode of the hydrostatic transmission according to the disclosure, the output is supported by the drive shaft 12 and via the secondary unit 2 working as a pump and via one of the two working lines 10 and via the primary unit 1 working as the motor and via the drive shaft 4 of the primary unit 1 on the diesel engine, which is then dragged round and decreases at least part of the braking energy of the mobile construction machine by means of the friction and acceleration forces, for example of the pistons thereof.

A pressure limiting valve 14 is provided on each working line 10, by means of which the respective working line 10 can be relieved of pressure into a feed line 16. This allows high-power braking, in which a significant part of the braking power is decreased via the pressure limiting valve 14 of the high-pressure working line 10.

The feed line 16 is filled with feed pressure medium from a tank T by a feed pump 18 that is rotationally fixedly coupled to the drive shaft 4 of the primary unit 1.

Furthermore, the feed line 16 can be relieved of pressure via a pressure limiting valve 20 to a tank T. The feed line 16 is connected to the two working lines 10 via a respective spring-loaded non-return valve 22, so that the respective working line 10 carrying low pressure may be supplied with additional pressure medium from the feed line 10. For this purpose, the opening directions of the two non-return valves 22 are directed from the feed line 16 to the respective working line 10.

The adjustment of the stroke volume Vg_pump of the primary unit 1 is carried out by means of an adjustment device 24. Said adjustment device 24 comprises a double acting control cylinder 26 with both control pressure chambers acting on a piston in opposition to each other, wherein the piston is coupled to an inclined disc of the primary unit 1 in the form of an axial piston machine. In the present case, the control cylinder is a differential cylinder, but can also be a ganged cylinder. Each of the two control pressure chambers can be filled with pressure medium from the feed line 16 via a separate control pressure valve 28. Both control pressure valves 28 are electrically adjusted by the control unit 8. Furthermore, the adjustment device 24 comprises a spring arrangement (not shown), by means of which the piston of the control cylinder 26 and the inclined disc of the primary unit 1 are biased into a central position. From there, the primary unit 1 can be adjusted in both directions in its stroke volume. Since the primary unit 1 allows a four-quadrant operation, with the hydrostatic transmission according to the disclosure driving forwards and braking forwards and driving backwards and braking backwards are possible.

In the exemplary embodiment shown, the secondary unit 2 is also adjustable, as already mentioned. For this purpose, an adjustment device 30 is used that comprises a valve with an electric actuator, which is also controlled by the control unit 8. In this case, the adjustment device 30 comprises a feedback spring 32, so that control of the swivel angle of the secondary unit 2 is possible.

High-power braking via the hydrostatic transmission according to the disclosure can be initiated by:
  a) a signal transmission from a control element operated by a driver, such as a brake pedal, to the control unit 8,
  b) a marginally high revolution rate of the diesel engine, which was determined by the control unit 8 by means of the revolution rate sensor 6,
  c) a marginally high driving speed v_veh of the mobile construction machine which was indirectly detected by a revolution rate sensor 34 of the drive shaft 12 of secondary unit 2 and transmitted to the control unit 8.

Figure 2:
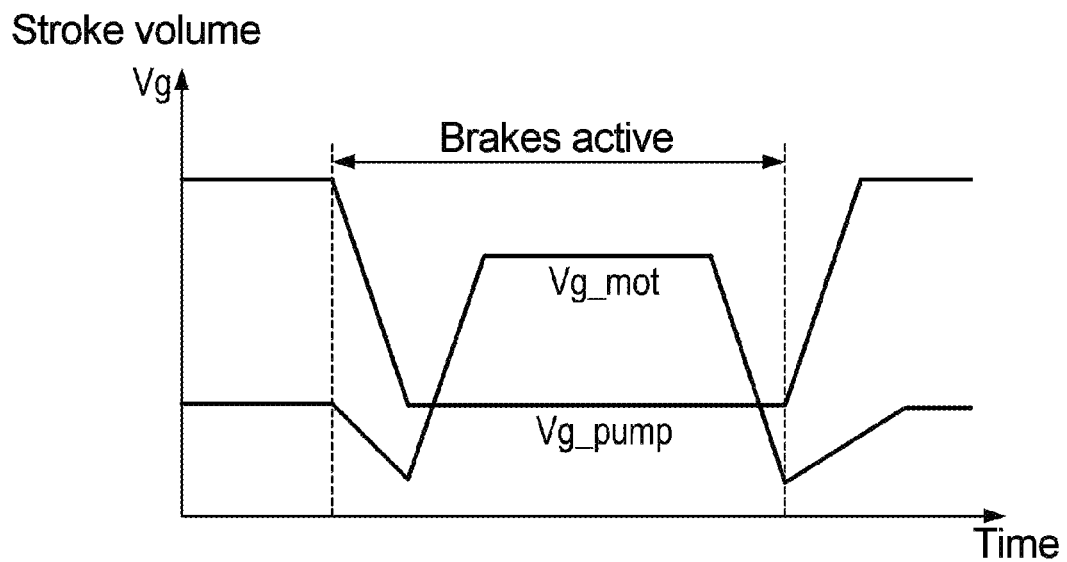
FIG. 2 shows a diagram of the stroke volumes of the primary unit and the secondary unit of the hydrostatic transmission of FIG. 1 during braking.

FIG. 2 shows in a diagram the variation with time of the swivel angle angle_pump of the primary unit 1 and the variation of the swivel angle angle_mot of the secondary unit 2, first for a transition from traction mode to high-power braking mode and then for a transition from high-power braking mode back to traction mode.

The high-power braking is controlled or regulated by the control unit 8. Initially, the swivel angle angle_pump and thus the capacity Vg_pump of the primary unit 1 is greatly reduced and at the same time the adjustment device 30 of the secondary unit 2 is controlled in such a way that its swivel angle angle_mot and thus its stroke volume Vg_mot are also reduced to a lesser extent. This increases the pressure in the now high-pressure working line 10 and the corresponding pressure limiting valve 14 opens a connection to the feed line 16. Then the swivel angle angle_mot of the secondary unit 2 is greatly increased.

Figure 3:
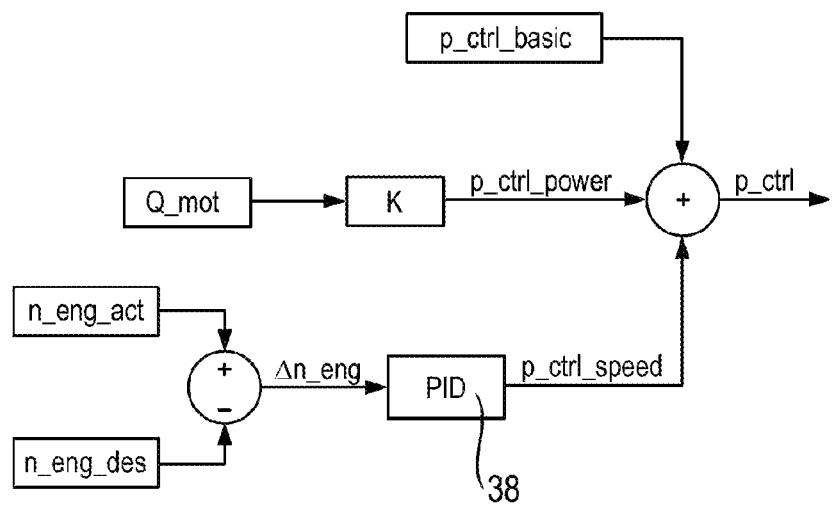
FIG. 3 shows a schematic overview of the pre-control with additional control of the control pressure of the primary unit during braking.
Figure 4:
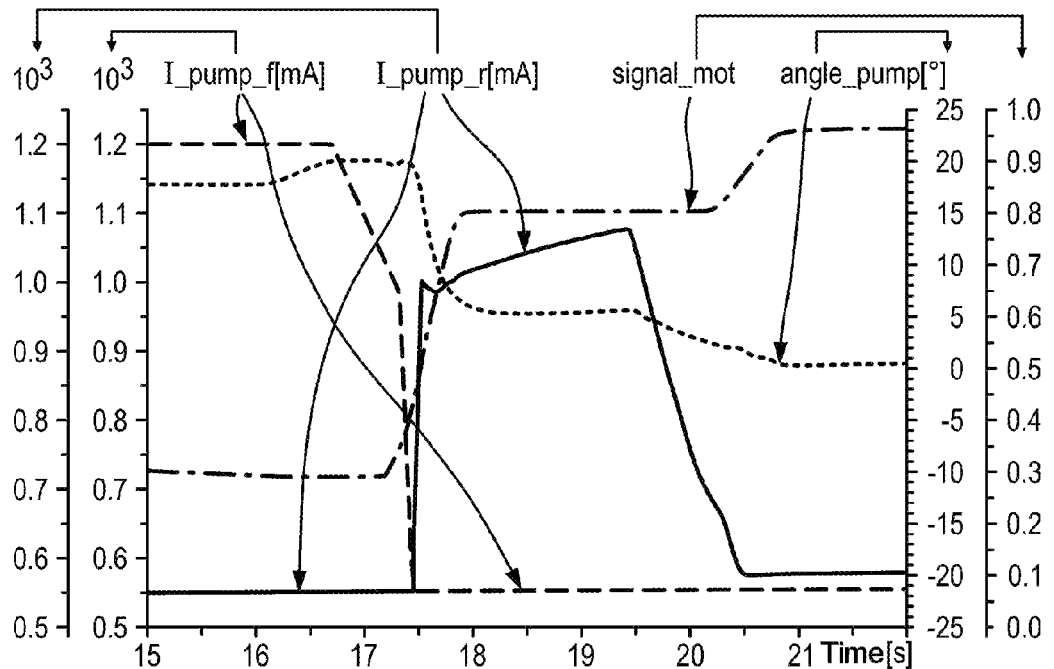
FIG. 4 shows two diagrams of the pre-control without revolution rate control according to the disclosure during braking.
Figure 4:
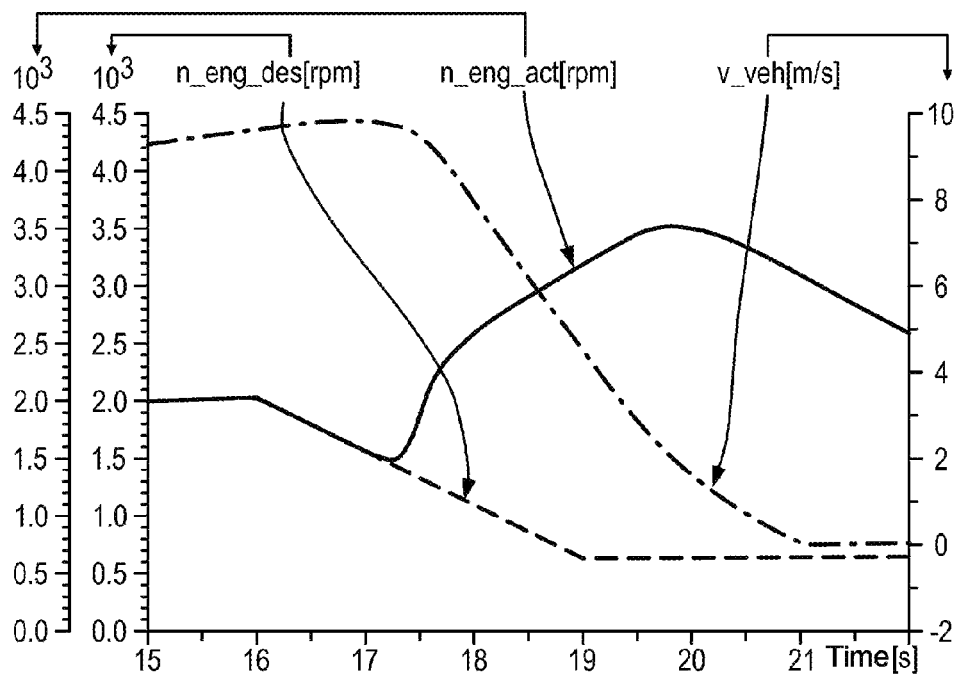
Figure 5:
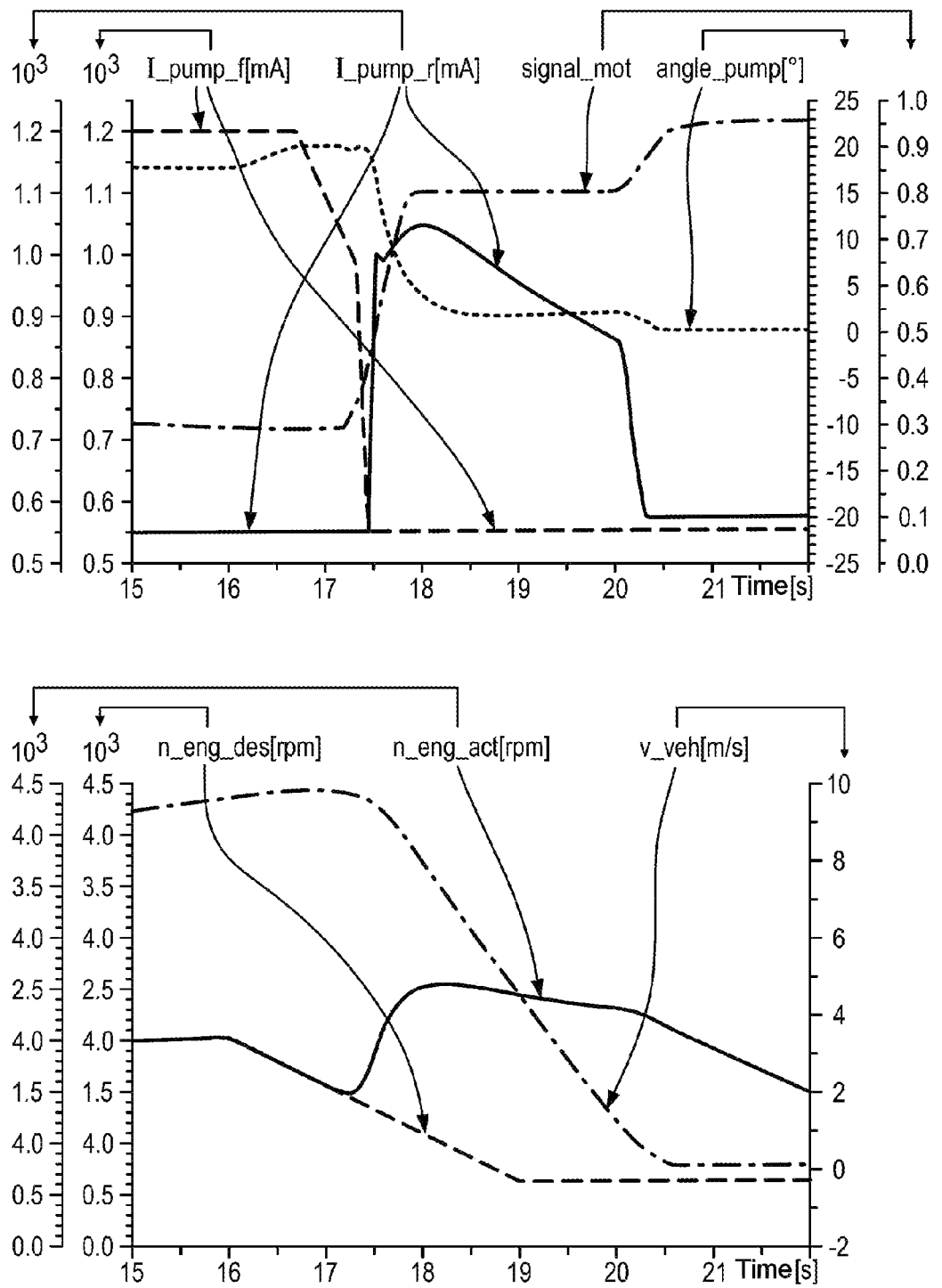
FIG. 5 shows two diagrams of the pre-control with additional revolution rate control according to the disclosure during braking.

In order to maximize the actual revolution rate of the diesel engine and not to exceed a permissible maximum revolution rate, the control and regulation explained with reference to FIGS. 3 to 5 is used.

According to FIG. 3, a control is superimposed on a pre-control to generate a final control pressure p_ctrl. The pre-control consists of two components of the control pressure, namely a constant base control pressure p_ctrl_basic and a proportional control pressure p_ctrl_power. The latter component is the product of the conveying volumetric flow Q_mot of the secondary unit 2 and a power factor K. This takes into account that the swinging forces on the swivel cradle increase as the braking power increases. Here, the dependence on the differential pressure $\Delta p$ of the two working lines 10 and larger pressure pulsations can also be taken into account.

A revolution rate controller 38 compares the actual revolution rate n_eng_act of the diesel engine with the target revolution rate n_eng_des of the engine and generates a correction control pressure p_ctrl speed for the final control pressure p_ctrl. Alternatively, the revolution rate n_pump_act of the primary unit 1 can be compared with a converted target revolution rate n_pump_des of the primary unit 1 and the correction control pressure p_ctrl speed can be generated.

During high-power braking, "negative" control pressures occur in the same direction of travel compared to traction mode. This means that in the case of high-power braking when driving forward, one of the control pressure chambers must be subjected to control pressure, which is actually required for reversing, in order to hold the swivel cradle at the corresponding angle angle_pump and to change from traction mode or deceleration mode without high-power braking to high-power braking mode. This can be seen in the following FIGS. 4 and 5 (upper part in each case) by removing the current I_pump_f of the control pressure valve 28 during forward travel and activating the current I_pump_r of the control pressure valve 28 during reversing.

FIG. 4 shows the pure pre-control. The primary unit 1 is already swiveled near the ideal swivel angle angle_pump. In the example shown, however, the primary unit 1 still stands at a capacity Vg_pump that is too large overall, which leads to an unacceptably high revolution rate n_eng of the diesel engine. In the case of a swivel angle angle_pump that is too small, the braking capacity of the diesel engine would only be partially used. This means that high-power braking with the load-sensitive primary unit 1 is already possible in principle, but only with limited performance.

An improvement of the high-power braking with the load-sensitive primary unit 1, so that comparable behavior occurs as in the use of a position-controlled primary unit 1, represents the solution according to the disclosure: The last deviations from the ideal value are ultimately compensated by the superimposed revolution rate controller 38, as can be seen in FIG. 5. This results in uniform utilization of the diesel engine during high-power braking without it reaching the inadmissible range of its revolution rate n_eng.

FIG. 4 shows how the hydrostatic transmission according to the disclosure behaves with pure pre-control. Here you can see the variation of the control current I_pump_r, which increases from the beginning of the high-power braking at t=17.5 s in the period up to t=19.5 s as required by the pre-control. However, the value determined for the pre-control leads to an excessively high actual revolution rate of the diesel engine n_eng_act of 3500 rpm at this working point.

In FIG. 5 in the upper part, the variation of the control current I_pmp_r when using the superimposed revolution rate controller 38 is shown with a solid line. It can be seen that at the beginning of the high-power braking at t=17.5 s the control current I_pmp_r is only slightly higher than in FIG. 4, but with the effect that the actual revolution rate n_eng of the diesel engine is only increased to 2500 rpm and then drops again in a controlled manner, even though the control current I_pmp_r is then significantly reduced compared to FIG. 4.

A hydrostatic transmission is disclosed with which high-power braking is possible, during which at least an adjustable traction motor acting as a pump is supported via a closed circuit on an adjustable axial piston machine acting as a motor, which in turn can be supported by an internal combustion engine. Since the engine should not be operated at too high a revolution rate, a control unit can adjust the swivel angle of the axial piston machine when braking. The axial piston machine is load-sensitive, since a relationship between the control pressure and the revolution rate and the pivot angle of the machine consists of a pressure difference between the two working lines of the closed circuit. Using a pre-control, we set a swivel angle of the axial piston machine when braking, and the swivel angle is corrected by means of a revolution rate controller in such a way that a target revolution rate of the internal combustion engine results. This is in particular the maximum revolution rate at which the internal combustion engine does not rotate at too high a revolution rate.

REFERENCE CHARACTER LIST

1 Primary unit
2 Secondary unit
4 Rotor/drive shaft
6 Revolution rate sensor
8 Control unit
10 Working line
12 Rotor/drive shaft
14 Pressure limiting valve
16 Feed line
18 Feed pump
20 Pressure limiting valve
22 Non-return valve
24 Adjustment device
26 Control cylinder
28 Control pressure valve
30 Adjustment device
32 Feedback spring
34 Revolution rate sensor
38 Revolution rate controller
angle_mot Swivel angle of the secondary unit
angle_pump Swivel angle of the primary unit
I_pump_f Control current of the control pressure valve for forward travel
I_pump_r Control current of the control pressure valve for reversing or for braking
n_eng_act Actual revolution rate of the internal combustion engine
n_eng_des Target revolution rate of the internal combustion engine
n_eng_max Maximum permissible revolution rate of the internal combustion engine
n_mot_act Actual revolution rate of the secondary unit
n_pump_des Target revolution rate of the primary unit derived from the target revolution rate of the internal combustion engine
n_pump_max Maximum revolution rate of the primary unit derived from the maximum revolution rate of the internal combustion engine
K Power factor
p_ctrl Final control pressure of the primary unit
p_ctrl_basic Basic control pressure of the primary unit
p_ctrl_power Proportional control pressure of the primary unit
p_ctrl speed Correction control pressure of the primary unit
Vg_mot Stroke volume of the secondary unit
Vg_pump Stroke volume of the primary unit
v_veh Speed of travel
Q_mot Conveying volumetric flow of the secondary unit
Q_pump Capacity of the primary unit
T Tank
Δn_eng Revolution rate difference between the target revolution rate and the actual revolution rate of the internal combustion engine
Δn_pump Difference between the target revolution rate and the actual revolution rate of the primary unit derived from the revolution rate difference between the target revolution rate and the actual revolution rate of the internal combustion engine
Δp Pressure difference between the two working lines

What is claimed is:

1. A hydrostatic transmission for a traction drive, comprising:
a load-sensitive primary unit including a primary rotor configured to be coupled to an internal combustion engine of the traction drive, the primary unit is an axial piston machine with an adjustable swivel angle;
a secondary unit including a secondary rotor configured to be coupled to an output of the traction drive;
two primary working lines of a closed circuit each configured to connect the primary unit and the secondary unit;
an electrical control unit configured to control the swivel angle of the primary unit, wherein during braking of the hydrostatic transmission the primary unit operates in a motor mode in which forces act on the primary unit that depend on at least one of (i) a pressure difference of the two primary working lines, and (ii) a revolution rate of the primary rotor, wherein the forces lead to an increase in the swivel angle of the primary unit; and
a revolution rate controller operably connected to the electrical control unit,
wherein the revolution rate controller is configured to generate an output variable corresponding to a correction control pressure that reduces the swivel angle of the primary unit, and
wherein the electrical control unit is configured to add the output variable to a pre-controlled variable corresponding to a pre-controlled control pressure to reduce the swivel angle in response to the forces.

2. The hydrostatic transmission according to claim 1, wherein an input variable of the revolution rate controller is a revolution rate difference between (i) an actual revolution rate of the internal combustion engine or a derived actual revolution rate that is derived from the actual revolution rate, and (ii) a target revolution rate of the internal combustion engine or a derived target revolution rate that is derived from the target revolution rate.

3. The hydrostatic transmission according to claim 1, wherein a sum of the pre-controlled control pressure and the correction control pressure is a final control pressure.

4. The hydrostatic transmission according to claim 3, wherein the final control pressure acts via an electric control pressure valve and a control cylinder of an adjustment device towards reducing the swivel angle of the primary unit.

5. The hydrostatic transmission according to claim 4, further comprising:
two control pressure chambers acting against each other and subjected to the final control pressure during the braking by the electrical control unit via a common or a respective electrically adjustable control pressure valve.

6. The hydrostatic transmission according to claim 4, wherein the adjustment device is an electrically controlled adjustment device in which a certain control pressure is adjusted according to a force of a proportional magnet.

7. The hydrostatic transmission according to claim 1, wherein the swivel angle of the primary unit is adjustable on both sides of a zero position.

8. The hydrostatic transmission according to claim 1, further comprising:
two pressure limiting valves configured to decrease a first part of a braking power during the braking, one pressure limiting valve of the two pressure limiting valves arranged on each working line of the two primary working lines,
wherein a second part of the braking power is decreased by the primary unit, and
wherein the two pressure limiting valves each have a flat characteristic in terms of a pressure difference as a function of a conveyed volumetric flow.

9. The hydrostatic transmission according to claim 1, wherein the electrical control unit is configured such that the braking is initiated by a control element of a vehicle or due to automatic monitoring of a speed of travel of the vehicle or a derived speed of travel that is derived from the speed of travel of the vehicle or based on automatic monitoring of an actual revolution rate of the internal combustion engine or a derived actual revolution rate derived from the actual revolution rate of the internal combustion engine.

10. A hydrostatic transmission for a traction drive, comprising:
a primary unit including a primary rotor configured to be coupled to an internal combustion engine of the traction drive, the primary unit is an axial piston machine with an adjustable swivel angle;
a secondary unit including a secondary rotor configured to be coupled to an output of the traction drive;
two primary working lines of a closed circuit each configured to connect the primary unit and the secondary unit;
an electrical control unit configured to control the swivel angle of the primary unit, wherein during braking of the hydrostatic transmission the primary unit operates in a motor mode in which forces act on the primary unit that depend on at least one of (i) a pressure difference of the two primary working lines, and (ii) a revolution rate of the primary rotor, wherein the forces lead to an increase in the swivel angle of the primary unit; and
a revolution rate controller operably connected to the electrical control unit,
wherein the revolution rate controller is configured to generate an output variable corresponding to a correction control pressure that reduces the swivel angle of the primary unit,
wherein the electrical control unit is configured to add the output variable to a pre-controlled variable corresponding to a pre-controlled control pressure, and
wherein the pre-controlled control pressure is a sum of a base control pressure and a proportional control pressure.

11. The hydrostatic transmission according to claim 10, wherein during the braking, the proportional control pressure is proportional to a conveying volumetric flow of the secondary unit.

12. A method for braking a hydrostatic transmission for a traction drive including a load-sensitive primary unit, a secondary unit, and two primary working lines of a closed circuit each configured to connect the primary unit and the secondary unit, the method comprising:
pre-controlling a control pressure of the load-sensitive primary unit, the primary unit coupled to an internal combustion engine of the traction drive via a primary rotor of the primary unit;
operating the primary unit in a motor mode during the braking;
increasing a swivel angle of the primary unit during the braking with forces acting on the primary unit that depend on at least one of (i) a pressure difference of the two primary working lines, and (ii) a revolution rate of the primary rotor;
determining a correction control pressure to reduce the swivel angle as a function of a revolution rate difference between (i) an actual revolution rate of the internal combustion engine or a derived actual revolution rate that is derived from the actual revolution rate, and (ii) a target revolution rate of the internal combustion engine or a derived target revolution rate that is derived from the target revolution rate;
adding the correction control pressure to the pre-controlled control pressure to determine a final control pressure;
supplying the final control pressure to the primary unit during braking of the hydrostatic transmission.

13. The method according to claim 12, further comprising: initiating the braking of the hydrostatic transmission by a driver's request or the derived actual revolution rate or due to exceeding a speed of travel or a derived speed of travel derived from the speed of travel.

14. The method according to claim 12, further comprising:
controlling a braking torque by adjusting a swivel angle of the secondary unit of the traction drive, the secondary unit coupled to an output of the traction drive via a secondary rotor of the secondary unit.

* * * * *